R. H. ROGERS.
COUPLING.
APPLICATION FILED JAN. 13, 1911.

1,065,969.

Patented July 1, 1913.

Witnesses:
Marcus L. Byng.
J. Ellis Glenn.

Inventor:
Robert H. Rogers,
by Albert G. Davis
His Attorney.

UNITED STATES PATENT OFFICE.

ROBERT H. ROGERS, OF SCHENECTADY, NEW YORK, ASSIGNOR TO GENERAL ELECTRIC COMPANY, A CORPORATION OF NEW YORK.

COUPLING.

1,065,969.  Specification of Letters Patent.  Patented July 1, 1913.

Application filed January 13, 1911. Serial No. 602,382.

*To all whom it may concern:*

Be it known that I, ROBERT H. ROGERS, a citizen of the United States, residing at Schenectady, county of Schenectady, State of New York, have invented certain new and useful Improvements in Couplings, of which the following is a specification.

My invention relates to couplings and particularly to sliding couplings for shafts in substantial alinement.

The object of my invention is to provide such a coupling which is flexible and thereby permits the coupling together of shafts which are not in perfect alinement.

My invention is particularly adapted for coupling the shaft of a machine, such as a paper refining machine of the Jordan type which must be adjusted in a longitudinal direction, to the shaft of an electric motor. No matter how perfect the alinement of the shafts of the motor and machine when they are first installed, after operating a time the bearings and other parts wear unevenly so that the shafts are no longer in exact alinement, and often, too, the motor is mounted on a separate base from that of the machine, which makes it very difficult to aline the shafts perfectly. In either of these cases it is necessary to have the coupling flexible as well as slidable, or otherwise the bearings become hot.

To this end, my invention consists in certain novel features of construction to be hereinafter more fully described and claimed.

Figure 1:
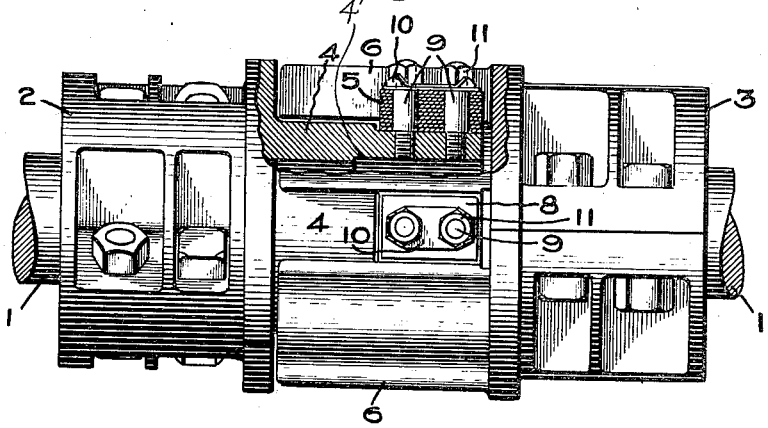
Figure 2:
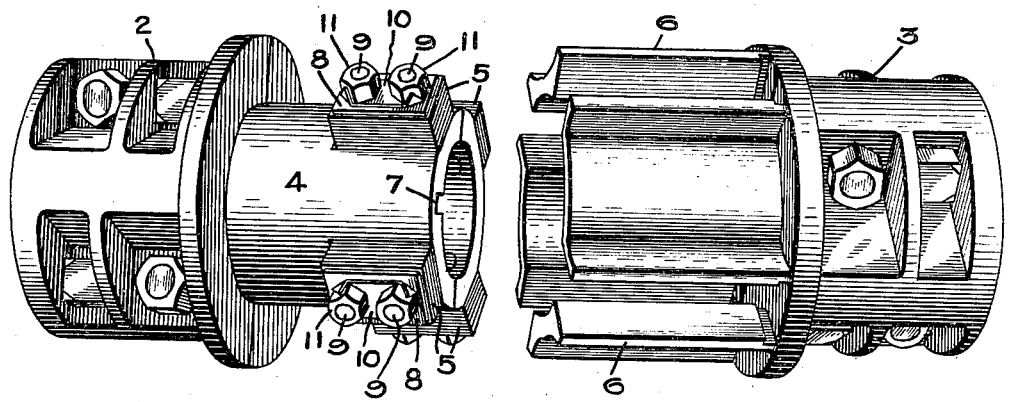

Referring to the accompanying drawing, Figure 1 is an elevation of my coupling with parts broken away and in section; and Fig. 2 is a perspective view of the parts of my coupling.

In the figures of the drawing, 1, 1' are the ends of shafts in substantial alinement, which are to be coupled together by means of my longitudinally adjustable coupling. This coupling comprises two members 2 and 3, one of these members being fastened to one of the shafts and the other member being fastened to the other shaft. The member 2 has a tubular extension 4 on which flexible projections 5 in the form of splines are mounted. The extension 4 is hollow and counterbored for a portion of its length to a diameter greater than the diameter of the shaft 1' as clearly seen at 4' (Fig. 1). The member 3 has a slotted extension 6 of slightly greater internal diameter than the external diameter of the extension 4, the flexible projections 5 fitting in said slots.

Each of the members of the coupling is formed in two parts which are bolted together about the shafts. The members of the coupling are provided with key-ways, one of which is seen at 7, for preventing the members of the coupling from rotating relative to the shafts. The cylindrical extension 4 is provided near its end with flat surfaces upon which the flexible projections 5 are mounted. These flexible projections are preferably built up of rectangular sheets of leather which are held in place by plates 8 and screw studs 9. A lock washer 10 is provided for keeping the nuts 11 on the studs 9 from becoming loose. By slotting the extension 6 of the member 3 of the coupling, axially extending arms are formed which fit between the flexible projections 5, are of substantially greater length than the flexible projections and may drive the other member 2 of the coupling through the flexible projections 5, or be driven thereby without changing the area on which the projections 5 bear, even though the ends of the shafts have been moved away from each other; or in other words, these arms will drive or be driven as long as they engage the flexible projections 5. By providing the counterbore 4' in the extension 4, the member 3 of the coupling may be slid along the shaft 1', thus permitting this shaft to be adjusted longitudinally into the counterbore. With this arrangement, the arm 6 need only be one-half the length that would otherwise be required.

By making the projections 5 of leather or other flexible material and by making the inside diameter of the extension 6 slightly greater than the external diameter of the extension 4 so that some play is allowed between them, my coupling furnishes a flexible drive between the two shafts and takes care of any case in which the shafts to be coupled together are not in perfect alinement.

What I claim as new and desire to secure by Letters Patent of the United States, is:—

1. In combination, a shaft capable of being adjusted in a longitudinal direction, a second shaft in substantial alinement with said first shaft, and a longitudinally adjustable coupling for said shafts comprising two members, one of said members being fastened to one of said shafts and having a tubular extension, said extension being counterbored to a slightly greater diameter than the diameter of said other shaft whereby said other shaft may extend therein, projections in the form of splines and comprising pieces of flexible material fastened to said extension near the end thereof, the other of said members being fastened to the other shaft and having a slotted extension of slightly greater internal diameter than the diameter of said first mentioned extension, said projections fitting in the slots, said slotted extension being of substantially greater length than said flexible projections whereby the bearing area of the flexible projections is not changed when the shafts are adjusted longitudinally.

2. In combination, a shaft capable of being adjusted in a longitudinal direction, a second shaft in substantial alinement with said first shaft, and a longitudinally adjustable coupling for said shaft comprising two members, each of said members being formed in parts, one of said members being fastened about one of said shafts and having a tubular extension, said extension being counterbored to a slightly greater diameter than the diameter of said other shaft whereby said other shaft may extend therein, flexible projections in the form of splines mounted on said extension near the end thereof, the other of said members being fastened about the other shaft and having a slotted extension of slightly greater internal diameter than the external diameter of said first mentioned extension, said projections fitting in the slots, said slotted extension being of substantially greater length than said flexible projections whereby the bearing area of the flexible projections is not changed when the shafts are adjusted longitudinally.

In witness whereof, I have hereunto set my hand this 11th day of January, 1911.

ROBERT H. ROGERS.

Witnesses:
BENJAMIN B. HULL,
HELEN ORFORD.